Patented July 28, 1925.

1,547,713

UNITED STATES PATENT OFFICE.

ALBERT A. ALLES, OF PITTSBURGH, PENNSYLVANIA.

HARDENING COMPOSITION FOR LIME.

No Drawing. Application filed December 30, 1924. Serial No. 758,946.

*To all whom it may concern:*

Be it known that I, ALBERT A. ALLES, residing at Pittsburgh, in the county of Allegheny and State of Pennsylvania, a citizen of the United States, have invented or discovered certain new and useful Improvements in Hardening Composition for Lime, of which improvements the following is a specification.

My invention is found in a hardening composition for lime, and it involves the use of calcium chloride as the hardening agent. My invention consists in so preparing the hardening agent that it may be introduced in the familiar operation of mixing mortar, and, being added will be effective to increase the induration of the mortar when, after being mixed it is spread.

I begin by thoroughly mixing together finely divided coke and finely divided anhydrous calcium chloride. I crush furnace coke and granulate it. Then spread the chloride upon the coke and pound and rub, making intimate mixture. Incident to this step of the operation, a great increase in volume occurs which, provisionally, I impute to the absorption by the chloride of the carbonaceous gases occluded in the coke.

To the relatively bulky mixture so produced I add inert finely divided material, and I have found suitable for this purpose, and available in sufficient quantity and as a refuse material having little or no intrinsic value, the ashes of soft coal. I mix the ashes with the mixture first described, preferably grinding the whole together, and when I have so achieved this second mixing step, I add also finely divided carbon, preferably in the form of charcoal, and continue the mixing operation until I get thorough distribution and intimate mingling of all the ingredients. I give proportions of an actual mixture, prepared in the performance of my invention. I give this statement of proportions by way of example, merely. I begin by taking equal volumes of coke dust and of commercial calcium chloride and pound and rub them together. If in the resulting mixture the chloride ingredient shows white, I add a little more coke dust, and continue pounding and rubbing, till the white appearance disappears. To six parts of Mason's hydrate (a commercial lime) I add one part of the compound prepared in the manner described, and to this body of Mason's hydrate and of specially prepared compound I find it advantageous to add small quantities of coal ashes and of powdered charcoal. I find it good to add 5%, by volume, of coal ashes and 0.5% of powdered charcoal. These components are mixed to homogeneity, and finally the mixture is combined with sand, in the ratio of 1:2.5. In preparing for use, water is added in relatively small quantities at first, and the mass is worked slowly.

The material so prepared does not deteriorate, and may be put up in sacks and shipped, as lime is shipped.

When mortar is mixed, of lime and sand, with water, the material I have described may be added, and mixed in, precisely as the lime is added and mixed in. The resultant plaster will be found to harden to a high degree of induration througout the depth of the layer in which it may be spread.

Experimentation has revealed the fact that the ultimate addition of charcoal to my preparation as described above insures equal induration throughout all the mass of mortar when it sets.

I claim as my invention—

1. A hardening composition for lime including finely divided coke and calcium chloride intimately mixed together.

2. A hardening composition for lime including finely divided coke and calcium chloride, intimately mixed together, and distributed through an inert finely divided carrier.

3. A hardening composition for lime including finely divided coke and calcium chloride, intimately mixed together and distributed through a carrier of coal ashes.

4. A hardening composition for lime including finely divided coke and calcium chloride, intimately mixed together, and distributed, together with finely divided carbon through the mass of an inert finely divided carrier.

5. The method herein described of preparing a hardening composition for lime which consists in grinding together coke and calcium chloride, and distributing the mixture, together with charcoal dust in a mass of coal ashes.

6. The method herein described of preparing a hardening composition for lime which consists in granulating coke, spreading anhydrous calcium chloride upon the mass of granulated coke, pounding and rubbing the material and making intimate mixture of the said components, and distributing the mixture together with finely divided carbon through the mass of inert finely divided material.

In testimony whereof I have hereunto set my hand.

ALBERT A. ALLES.

Witnesses:
BAYARD H. CHRISTY,
PERCY A. ENGLISH.